Feb. 17, 1959     D. H. OTTO     2,874,262
BUTT WELDING APPARATUS

Filed March 18, 1957     2 Sheets-Sheet 1

Inventor
D. H. OTTO
By W. A. Johnson
Attorney

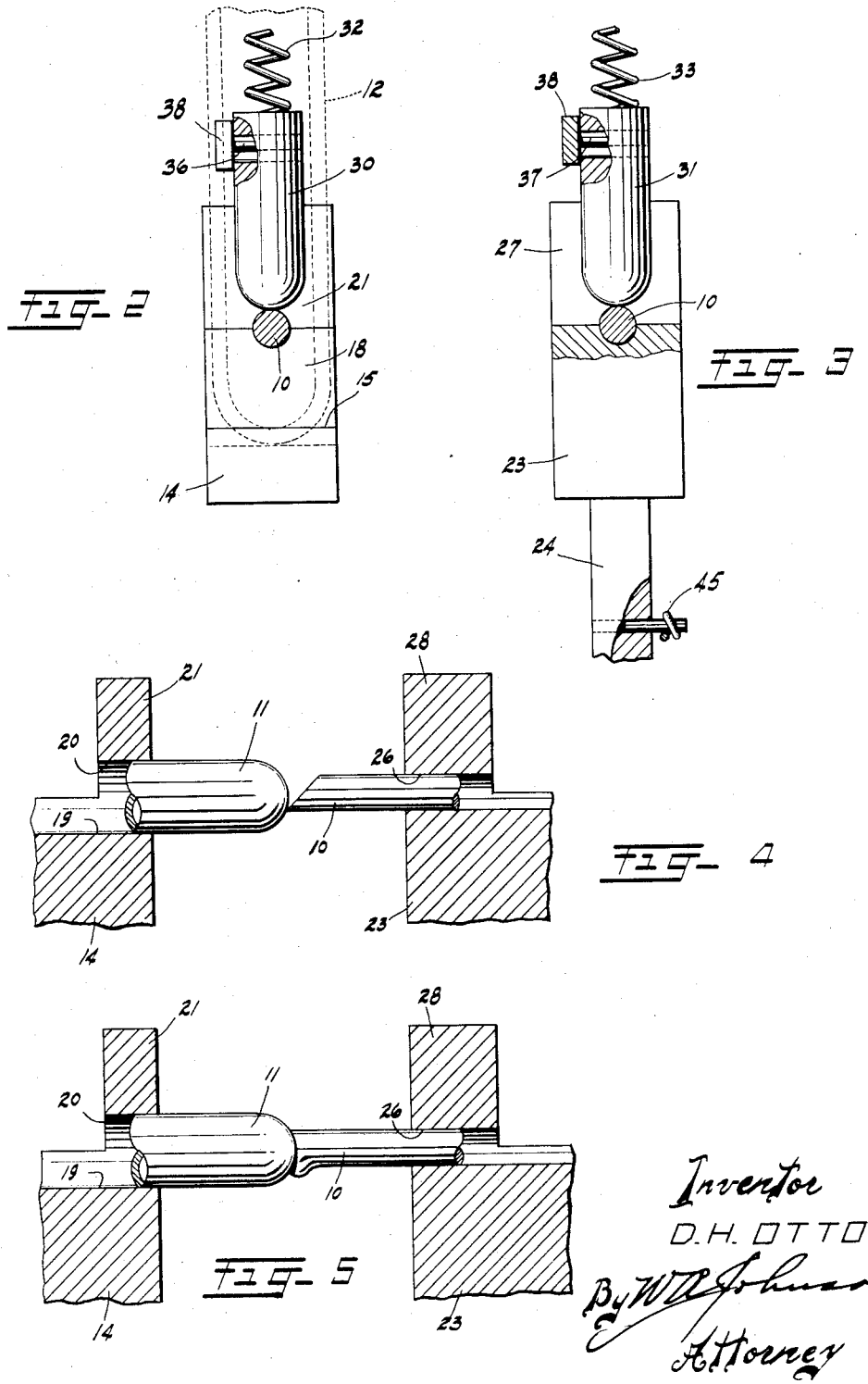

United States Patent Office 2,874,262
Patented Feb. 17, 1959

2,874,262

BUTT WELDING APPARATUS

Dettmer H. Otto, Salem Depot, N. H., assignor to Western Electric Company, Incorporated, New York, N. Y., a corporation of New York Application March 18, 1957, Serial No. 646,807

6 Claims. (Cl. 219—57)

This invention relates to butt welding apparatus particularly apparatus for butt welding lead wires to terminals of electrical components.

Butt welding of elongate articles, particularly those of small diameters such as wires or of conventional lead wires to terminals, requires relative movement of the electrodes supporting the articles to produce a strong weld. This movement results in piling up at the weld of molten material formed particularly from the smaller article or wire being welded thereby avoiding the formation of weak welds in cases where the initial contact is poor due to irregular or diagonally cut ends. Furthermore, it is important, with small diameter articles, that they be aligned centrally and held in this position during the welding operation. Frequently in welding apparatus, the supports for the articles being welded may be suitable to locate the articles accurately initially but unless these areas are shielded against subjection to carbonization by the welding arcs, the subsequent alignment of the parts is not assured. Furthermore, after a weld has been made, it is important to prevent relative movement of electrodes while the work is clamped therein since such movement may overstress and hence impair or destroy the weld.

An object of the invention is a provision of the solution to these various problems in a butt welding apparatus.

One embodiment of the invention according to the object includes a fixed electrode to support one article, a movable electrode to support another article with clamps actuable to hold the articles in abutting engagement with each other on their electrodes. In this structure, means is provided normally to move the movable electrode from a starting to a finishing position while an actuator is movable in one direction to cause the movable electrode to move into its starting position and hold it there until the clamps are closed.

More specifically, the actuator is normally urged into its starting position through a relatively strong spring and is latched in its actuated position by a solenoid latch at which time a circuit is closed to discharge the welding current through the electrodes.

An interlocking means provides a safety feature through a mechanism actuated by a treadle to move the clamps free of the articles before the movable electrode can be returned to its starting position. As soon as the clamps are released, a circuit is completed through the solenoid latch to release it from the actuator, allowing the spring thereof to return the actuator to its starting position, freeing the switch to open and forcing the push rod to move the movable electrode to its starting position.

Other objects and advantages will be apparent from the following detailed description when considered in conjunction with the accompanying drawing, wherein:

Fig. 2 is an end elevational view of the fixed electrode looking from the left thereof in Fig. 1;

Fig. 3 is an end elevational view of the movable electrode taken from the left (Fig. 1);

Fig. 4 is a fragmentary sectional view of portions of the electrodes in the starting position, and Fig. 5 is a fragmentary sectional view of the electrodes in the finishing position.

Figure 1:
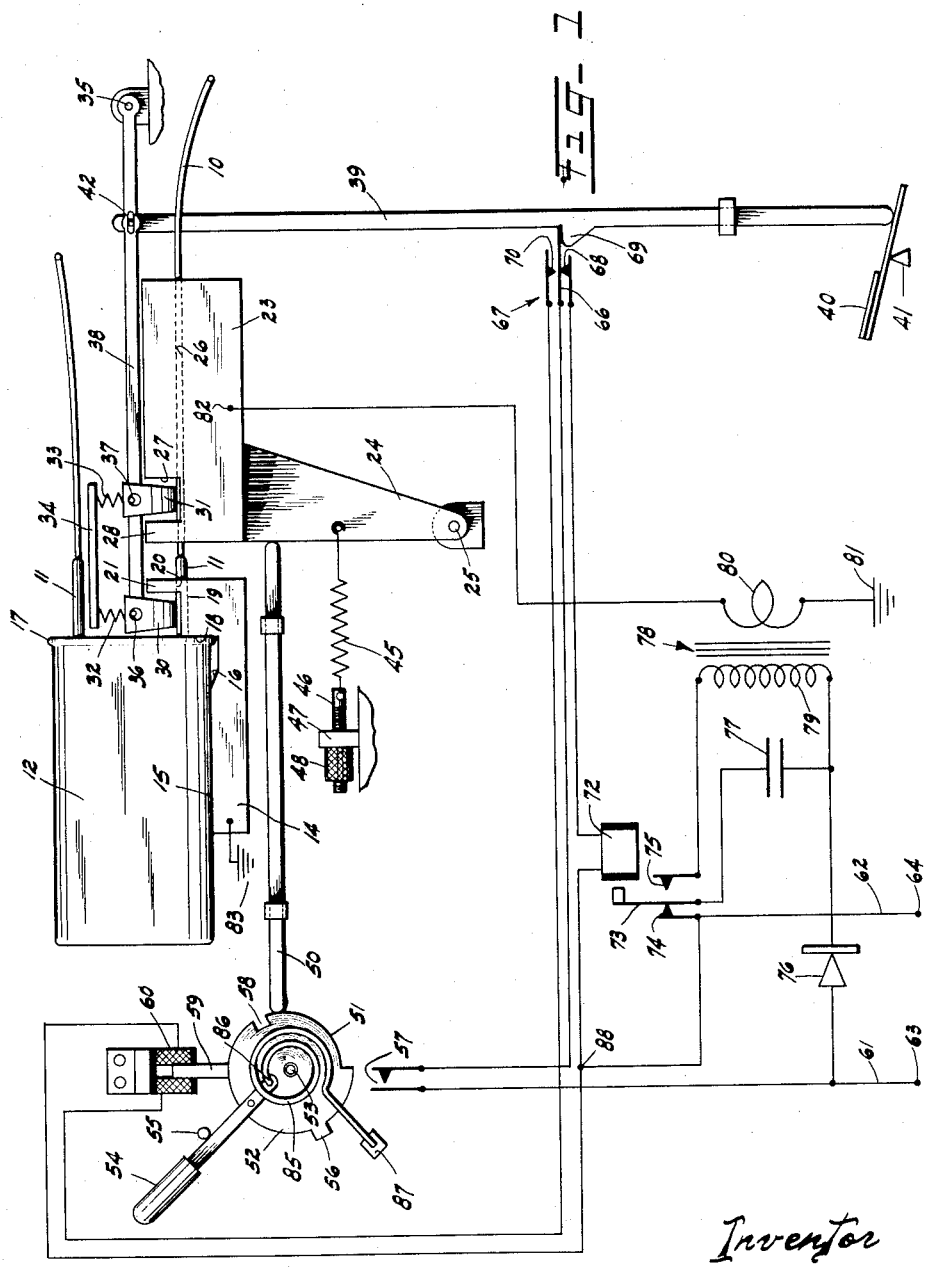
Fig. 1 is a schematic illustration of the butt welding apparatus.

In the present instance, the articles to be butt welded are lead wires 10 and terminals 11 of an electrical component 12.

A fixed electrode 14 has an upper surface 15, formed with a cutaway portion 16 to support the component 12 with an outwardly flared end 17, and a surface 18 against which this end of the component may be positioned. The portion of the electrode 14 for receiving and supporting the terminal 11 has a semi-cylindrical groove 19 which communicates with an aperture 20 in an upwardly extending shield 21. A movable electrode 23 has an integral leg 24 supported for movement on a pivot 25. An aperture 26 extends longitudinally through the electrode 23 for the wire 10 except at an open portion 27 where a semi-cylindrical groove is provided to support the wire. An apertured forward portion 28 acts as a shield for the supporting and clamping area of the electrode.

Clamps 30 and 31 for the terminal 11 and the wire 10 respectively, have rounded lower ends as shown in Figs. 2 and 3 respectively, and are urged downwardly by springs 32 and 33 backed, in any suitable manner, against a fixed support 34. The springs 32 and 33 provide the necessary clamping force to hold the articles being welded against their respective electrodes during the welding operation. The clamps 30 and 31 are connected in any suitable manner, such as by pins 36 and 37 to an arm 38 which may be rocked about a pivot 35 by a rod 39 actuated by a treadle 40. The fulcrum for the treadle is indicated at 41 and in the present instance, the upper end of the rod 39 is pivotally connected at 42 to the arm 38. This mechanism for actuating the clamps is merely schematic and may be of any desired structure capable of being actuated by a foot treadle to raise the clamps free of the articles being welded.

A spring 45 having one end connected to the leg 24 of the movable electrode 23 and the other end connected to an adjustable screw 46 extending through an aperture in a fixed bracket 47 and having an adjusting nut 48 mounted thereon, may provide variable forces to urge the movable electrode from its starting position, shown in Fig. 1, to its finishing position shown in Fig. 5.

A push rod 50 having one end engaging the leg 24 of the movable electrode functions for movement of the electrode 23 into its starting position and for holding it in this position until everything is in readiness for the welding operation. The other end of the rod 50 is positioned to ride upon a cam surface 51 of an actuator 52 which is pivoted at 53 and movable by a handle 54 from its normal position, shown with the handle against a stop 55, to its operated position where a low portion of the cam 51 will be in alignment with the rod 50. Also, at the operated position, a projection 56 will close a normally open switch 57 and a notch 58 will be moved into alignment with a core type latch 59 of a solenoid 60 so that the latch may drop into the notch 58 and lock the actuator in its operated position.

The schematic wiring diagram of Fig. 1 illustrates lines 61 and 62 connected to terminals 63 and 64 of a main source of electrical energy. One contact of the switch 57 is connected directly to line 61 whereas the other contact is connected to a central contact 66 of a switch 67. The central contact 66 of switch 67 is normally held against its bottom contact 68 but may be moved, by a projection 69 on the rod 39, away from its bottom contact 68 and into engagement with its top contact 70 when the treadle 40 is pressed downwardly to actuate the rod 39 to raise the clamps 30 and 31. A relay 72 is in a circuit with the bottom contact 68 and has a central contact 73 normally held against its left contact 74 but movable away from the left contact and into engagement with its right contact 75 when the relay 72 is energized. The normal closing of contacts 73 and 74 completes a circuit from line 61 through a selenium rectifier 76, a capacitor 77 and through the contacts to line 62. When the relay 72 is energized, opening contacts 73—74 and closing contacts 73—75, the capacitor 77 is discharged through a transformer 78, including a primary winding 79 and a secondary winding 80. The secondary winding 80 has one side grounded at 81 and the other side connected at 82 to the movable electrode 23. The fixed electrode 14 has a ground 83.

In carrying out the butt welding operation, the treadle 40 is pressed downwardly, moving the clamps 30 and 31 upwardly during which time the component 12 may be located on the fixed electrode 14 with one of its terminals 11 resting in the supporting groove 19 and extending through the aperture 20 in the shield 21. The leading end of the wire 10 positioned in the aperture 26 is moved into close engagement with the end of the terminal 11. During this interval, the movable electrode is held in its starting position by the rod 50 and the actuator 52 which, in the present instance, is at its normal position against the stop 55. When the component and the lead wire have been positioned, the treadle 40 may be released allowing the clamps 30 and 31 to move under the force of their springs 32 and 33 against their respective articles namely, the terminal 11 and the wire 10, as shown particularly in Figs. 2 and 3. At this time, the actuator 52 may be moved against the force of the spiral spring 85, one end of which is fixed at 86 to the inner end of the handle and the other end is fixed to a stationary block 87. The actuator 52 is moved until the recess 58 is moved into registration with the latch 59, allowing the latch to drop into the notch. During this movement of the actuator 52, the adjacent end of the rod 50 riding downwardly upon the cam surface 51 will allow the spring 45 to function, applying a pulling force to the movable electrode 23. The electrode 23 will not move at this time as the parts being welded prevent its movement until they have been softened in the area of abutting ends during the application of the welding current. Furthermore, this movement of the actuator 52 into its operated position causes the projection 56 to close a switch 57, completing a circuit from line 61, through the contacts of open switch 57, contacts 66 and 68 of switch 67, relay 72, through connection 88 to line 62. Energization of the relay 72 breaks contacts 73—74 and makes contacts 73—75 to discharge the capacitor 77 through primary winding 79, secondary winding 80, electrode 23, wire 10, terminal 11 and electrode 14. The shields 21 and 28 of the electrodes 14 and 23 protect the article locating areas of the electrodes against carbonization resulting from the welding arcs. Furthermore, the apertures 20 and 26 of the electrodes are substantially closed by the parts being welded and serve as positive locating means for the parts.

The high step-down ratio of the transformer 78 provides a very strong current induced in the secondary winding 80 and discharged at the wire and terminal connecting point to rapidly soften the portions of the articles to produce a satisfactory weld. As soon as the articles are softened, the spring 45 may function to cause movement of the electrode 23 about its supporting pivot 25. It is not possible for the operator to disturb the weld while either part is being clamped due to the latch 59 locking the actuator against movement of the rod 50 until the clamps 30 and 31 have been moved upwardly by downward pressure on the treadle 40 to move the rod 39 and the arm 38 upwardly.

When the treadle is actuated after the welding operation, contacts 66—70 of switch 67 are closed, completing a circuit through the solenoid 60, the energization of which moves the latch or projection 69 upwardly free of the notch 58 and rendering the spring 85 effective to return the actuator 52 to its starting position with the arm 54 against the stop 55, opening the switch 57 and causing the cam 51 to move the rod 50 to the right to return the movable electrode 23 to its starting position.

This completes one welding operation, and, after the component with the lead wire welded to its terminal has been removed and the lead wire severed, leaving a desired length attached to the terminal, the apparatus is ready for the next welding operation. A cutter (not shown) for the lead wire may be mounted at a convenient location so that the wire may be pulled through the aperture 26 of the electrode 23 until the desired portion is located in the cutter. After the wire is cut the remaining leading end of the wire may be pulled back for abutting engagement with the terminal to which it is to be butt welded.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for butt welding adjacent ends of elongate articles, electrodes formed to receive the articles with their adjacent ends in abutting engagement with each other, one of the electrodes being fixed, means to support the other electrode for movement from a starting position to a finishing position, means normally urging the movable electrode toward the finishing position, an actuator mounted for movement from a normal position, where it holds the movable electrode in its starting position, to an operated position where the electrode is free to move into its finishing position, a normally open switch adapted when closed to cause a welding current to flow through the electrodes to butt weld the articles during which time the abutting portions of the articles will soften to permit the movable electrode to move to its finishing position, means on the actuator to close the switch when the actuator is moved into its operated position, clamps normally holding the articles on their electrodes, means to move the clamps free of the articles, means to latch the actuator in its operated position, and means actuable only when the clamps are free of the articles to unlatch the actuator.

2. In an apparatus for butt welding adjacent ends of elongate articles, electrodes formed to receive the articles with their adjacent ends in abutting engagement with each other, one of the electrodes being fixed, means to support the other electrode for movement from a starting position to a finishing position, means normally urging the movable electrode toward the finishing position, an actuator mounted for movement from a normal position, where it holds the movable electrode in its starting position, to an operated position where the electrode is free to move into its finished position, a normally open switch adapted when closed to cause a welding current to flow through the electrodes to butt weld the articles during which time the abutting portions of the articles will soften to permit the movable electrode to move to its finishing position, means on the actuator to close the switch when the actuator is moved into its operated position, clamps normally holding the articles on their electrodes, means to move the clamps free of the articles, means to latch the actuator in its operated position, means actuable only when the clamps are free of the articles to unlatch the actuator, and means actuable when the actuator is unlatched, to return the actuator to its normal position and cause it to move the movable electrode to its starting position.

3. An apparatus for butt welding a lead wire to a terminal of an electrical component comprising a fixed electrode adapted to support a terminal of a component, a movable electrode adapted to receive a lead wire at a starting position and supported for movement to a finishing position, clamps actuable to hold the terminal and lead wire in abutting engagement with each other on their electrodes, means normally urging the movable electrode toward the finishing position, a switch actuable to cause a welding current to flow through the electrodes to butt weld the lead to the terminal, an actuator mounted for movement between a normal position and an operated position, means operatively connected to the actuator to force the actuator into its normal position and thereby cause the actuator to force the movable electrode into its starting position and hold it there, the actuator being adapted to actuate the switch when moved into the operated position, and a latch adapted to secure the actuator in its operated position.

4. An apparatus for butt welding a lead wire to a terminal of an electrical component comprising a fixed electrode adapted to support a terminal of a component, a movable electrode adapted to receive a lead wire at a starting position and supported for movement to a finishing position, clamps actuable to hold the terminal and lead wire in abutting engagement with each other on their electrodes, means normally urging the movable electrode toward the finishing position, a switch actuable to cause a welding current to flow through the electrodes to butt weld the lead to the terminal, an actuator mounted for movement between a normal position and an operated position, means operatively connected to the actuator to force the actuator into its normal position and thereby cause the actuator to force the movable electrode into its starting position and hold it there, the actuator being adapted to actuate the switch when moved into the operated position, a latch adapted to secure the actuator in its operated position, and means operable to move the clamps simultaneously free of the terminal and wire.

5. An apparatus for butt welding a lead wire to a terminal of an electrical component comprising a fixed electrode adapted to support a terminal of a component, a movable electrode adapted to receive a lead wire at a starting position and supported for movement to a finishing position, clamps actuable to hold the terminal and lead wire in abutting engagement with each other on their electrodes, means normally urging the movable electrode toward the finishing position, a switch actuable to cause a welding current to flow through the electrodes to butt weld the lead to the terminal, an actuator mounted for movement between a normal position and an operated position, means operatively connected to the actuator to force the actuator into its normal position and thereby cause the actuator to force the movable electrode into its starting position and hold it there, the actuator being adapted to actuate the switch when moved into the operated position, a latch adapted to secure the actuator in its operated position, means operable to move the clamps free of the terminal and wire, and means operable only in response to the freeing of the clamps by their moving means to move the latch free of the actuator to render the forcing means for the actuator effective to move the actuator to its normal position and cause the actuator to move the movable electrode to its starting position.

6. In an apparatus for butt welding adjacent ends of elongate articles, electrodes having centrally aligned apertures therein extending through adjacent ends of the electrodes and conforming in cross-sectional contour to their respective elongate articles to locate and hold the articles in alignment with each other, the electrodes having portions, short of their adjacent ends, cut away partially through the apertures to expose portions of the articles in their apertures and form clamping pockets in the electrodes shielded from a welding area adjacent the abutting ends of the articles, and clamps extending into the pockets to firmly engage the exposed portions of the articles and hold them against movement in their apertures.

References Cited in the file of this patent
UNITED STATES PATENTS

| 398,914 | Thomson | Mar. 5, 1889 |
| 585,160 | Eyre | June 22, 1897 |
| 2,018,379 | Pfeiffer | Oct. 22, 1935 |